(No Model.)

T. DOYLE.
ROPE TREAD HORSESHOE.

No. 492,665.  Patented Feb. 28, 1893.

Witnesses,

Inventor,
Thomas Doyle
By Dewey & Co
Attys

UNITED STATES PATENT OFFICE.

THOMAS DOYLE, OF SAN FRANCISCO, CALIFORNIA.

ROPE-TREAD HORSESHOE.

SPECIFICATION forming part of Letters Patent No. 492,665, dated February 28, 1893.

Application filed October 24, 1892. Serial No. 449,848. (No model.)

*To all whom it may concern:*

Be it known that I, THOMAS DOYLE, a citizen of the United States, residing in the city and county of San Francisco, State of California, have invented an Improvement in Horseshoes; and I hereby declare the following to be a full, clear, and exact description of the same.

My invention relates to a novel construction for horse shoes.

It consists in forming the shoe of metal in the usual manner with a deep groove or channel around its lower face, within which is packed a filling of tarred rope which is held in place by the dove-tailed form of the channel, and by exterior lugs which are partially bent over it. Outside of the channel are formed the nail holes by which the shoe is fastened to the foot.

The accompanying drawings explain the construction more fully:—

Figure 1:
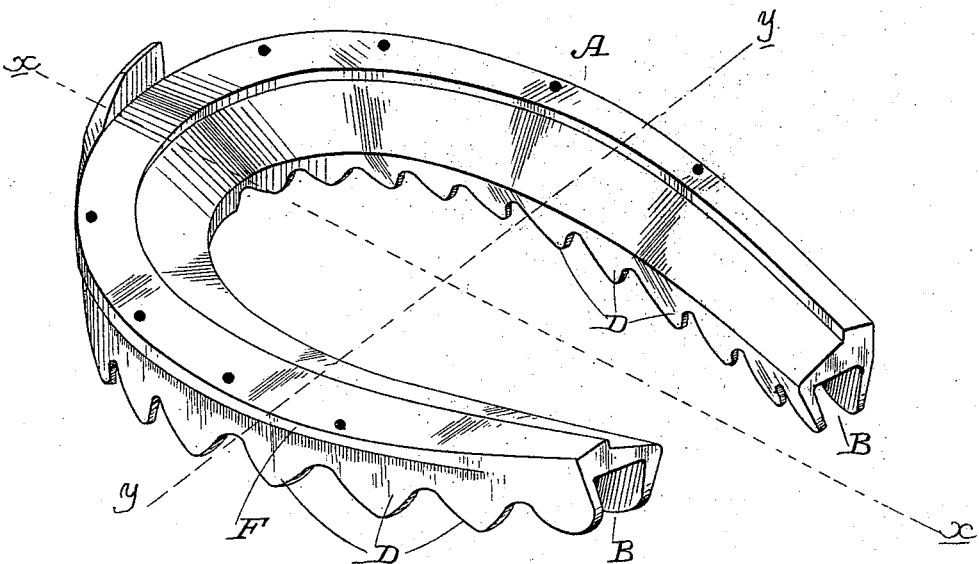
Figure 2:
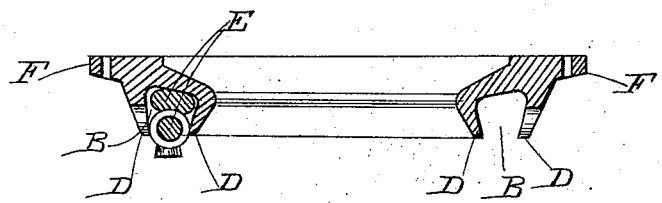
Figure 3:
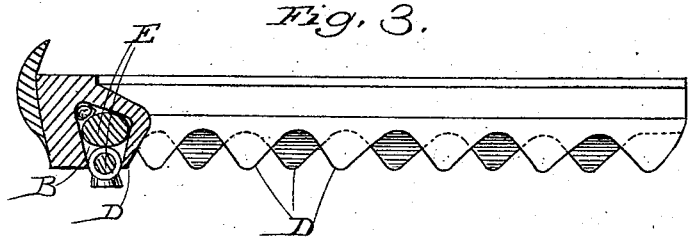

Figure 1 is a view of my improved horse shoe, the elastic filling being omitted. Fig. 2 is a transverse section on the dotted line $y-y$ of Fig. 1, the elastic filling being shown on one side of the channel only. Fig. 3 is a longitudinal section on the dotted line $x-x$ of Fig. 1.

A is a horse shoe having a deep dove-tail shaped channel formed in the lower face, as shown at B. The edges of this channel are formed with lugs or teeth D, the outer ones alternating with the interior ones. The channel is filled with tarred rope E which is firmly twisted and pressed into place in the channel, and the lugs or teeth are slightly bent over it alternately from opposite sides, so as to retain it in place, while at the same time presenting a sufficient protruding surface of the rope so that the weight of the animal upon the ground will be carried upon the rope filling, instead of the iron of the shoe. This provides a soft and elastic support for the foot, relieves the jar of travel on hard pavements, and gives a firmer hold for the feet in pulling a load. The lugs or teeth also act as calks to prevent slipping upon a smooth surface.

In order to secure this shoe to the foot, I have shown an exterior flange F outside of the outer wall of the channel having the necessary holes made in it for the passage of the nails by which the shoe is secured to the foot.

In snowy countries, two layers of rope may be fixed in the channel, one below the others, and the outer one has calks fixed to it and projecting so as to engage the surface. The inner one forms an elastic support upon which the calks rest. These calks are preferably formed with an aperture in their inner ends through which the outer layer of rope is run, thus serving in addition to the lugs, as means for securely retaining the calks in position.

Having thus described my invention, what I claim as new, and desire to secure by Letters Patent, is—

1. A horse shoe having a channel made from end to end in its lower surface, the edges of said channel formed with lugs, the outer ones alternately with the inner ones, and a filling of rope fitted and secured in said channel by bending down said lugs, substantially as herein described.

2. A horse shoe having a channel made from end to end in its lower surface, the edges of said channel being formed with teeth, a filling of rope fitted and secured in said channel by turning down the lugs, and a marginal ledge having nail holes therein, substantially as herein described.

3. A horse shoe having a channel made from end to end in its lower surface, a filling of rope in two or more layers secured in said channel, and calks having apertures in their inner ends through which the outer layer is run, while the inner layer forms an elastic cushion for the calks, substantially as set forth.

4. A horse shoe having a channel made from end to end in its lower surface, a filling of rope in two or more layers secured in the channel, and calks secured to the outer layer and projecting therefrom, while the inner layer forms an elastic support for the calks, substantially as herein described.

In witness whereof I have hereunto set my hand.

THOMAS DOYLE.

Witnesses:
S. H. NOURSE,
J. A. BAYLESS.